(12) United States Patent  
Torii

(10) Patent No.: US 7,266,643 B2
(45) Date of Patent: Sep. 4, 2007

(54) INFORMATION PROCESSING DEVICE

(75) Inventor: Sunao Torii, Minato-ku (JP)

(73) Assignee: NEC Corporation (JP)

( * ) Notice: Subject to any disclaimer, the term of this patent is extended or adjusted under 35 U.S.C. 154(b) by 394 days.

(21) Appl. No.: 10/879,855

(22) Filed: Jun. 28, 2004

(65) Prior Publication Data

US 2004/0268072 A1 Dec. 30, 2004

(30) Foreign Application Priority Data

Jun. 26, 2003 (JP) ............................. 2003-182616

(51) Int. Cl.
*G06F 13/16* (2006.01)
(52) U.S. Cl. ...................................... 711/118
(58) Field of Classification Search ................ 711/118; 345/537, 539, 557
See application file for complete search history.

(56) References Cited

U.S. PATENT DOCUMENTS 5,848,264 A * 12/1998 Baird et al. ................... 703/28
6,366,984 B1 * 4/2002 Carmean et al. ............ 711/141

FOREIGN PATENT DOCUMENTS

JP 09-190169 7/1997

* cited by examiner

*Primary Examiner*—Kevin L. Ellis
(74) *Attorney, Agent, or Firm*—Ostrolenk, Faber, Gerb & Soffen, LLP

(57) ABSTRACT

The data processing unit uses, for predetermined information processing, a series of data read by uniformly accessing a predetermined address range of the external storage device through the external interface. The determination unit determines whether to write the data read from the external storage device by the data processing unit to the internal storage unit or not and writes, to the internal storage unit, data determined to be written to the internal storage unit. When again reading data within the same address range of the external storage device, the data processing unit alternatively reads data from the internal storage unit.

16 Claims, 12 Drawing Sheets

INFORMATION PROCESSING DEVICE

BACKGROUND OF THE INVENTION

1. Field of the Invention

The present invention relates to a processor, ASIC and SOC having an on-chip memory for use in a case where access to an external memory as a specific region is repeated and, more particularly, to an information processing device having a function of displaying a screen on an image display device such as an LCD or a CRT.

2. Description of the Related Art

For displaying images on such a screen as an LCD (Liquid Crystal Display) or a CRT (Cathode Ray Tube), data is read from a memory called a frame buffer which stores information about luminance and color corresponding to each pixel and applied to the LCD or the CRT. Access to the frame buffer is ordinarily repeated 60 to 75 times a second.

With a simple structure, when a write access to a frame buffer at the time of rewriting a screen (at the time of information updating) and a read access to apply data from the frame buffer to an LCD or a CRT compete with each other, the screen will be disturbed. Therefore, it is a common practice to prepare frame buffers for two or more screens to switch and use a write side buffer and a read side buffer. Such a buffer structure is called double-buffer structure.

On the other hand, recent application processors for a portable terminal having an image displaying function have an LCD controller for image output, a DMA controller for data transfer, a processor or a DSP for image processing, and an on-chip memory integrated into one chip for increasing application performance and integration density and because of constraints on packaging.

FIG. 10 is a block diagram showing a structure of a conventional and typical application processor. With reference to FIG. 10, integrated on a chip of a conventional application processor are a processor core 1001, a peripheral active core 1002, an LCD display control device 1003, an on-chip memory 1004, a peripheral passive core 1005 and a core of a memory interface 1006. These are connected with each other through an on-chip address bus 1007 and an on-chip data bus 1008. The LCD display control device 1003 is connected to an LCD panel 1009 outside the chip. The memory interface 1006 is connected to an external memory 1010 outside the chip.

The processor core 1001 may have an on-chip cache within the core in some cases.

The on-chip memory 1004, whose application is determined by software or the like, is used as a program code region, a work region or a frame buffer region.

The LCD display control device 1003, which holds information about a start address of a frame buffer and a frame buffer size in an internal register (not shown), reads data from a frame buffer disposed on the on-chip memory 1004 or the external memory 1010 in accordance with a display speed of the LCD panel 1009 and applies the same to the LCD panel 1009.

When the frame buffer has a double-buffer structure, the LCD display control device 1003 holds addresses of two or more frame buffers and sets a frame buffer for use in displaying an image by means of the processor core 1001. Then, when rewriting an image, display of an image having no distortion such as flicker is realized by changing the setting.

FIG. 11 is a diagram for use in explaining screen switching. In this example, there are two frame buffers, frame buffers A and B. When one is used for generating new image data, the other is used for displaying an image. Frame buffer for use in generating image data is referred to as a drawing frame buffer and a frame buffer for use in displaying an image is referred to as a display frame buffer. Drawing frame buffer and a display frame buffer are alternately switched.

This allows, in line with application of data of 60 screens a second to the LCD panel 1009 by the LCD display control device 1003 by using one frame buffer, the processor core 1001, for example, to generate data of a new image in other frame buffer.

With reference to FIG. 11, frame buffer switching is conducted every 67 ms ($1/15$ second). First, the LCD display control device 1003 uses the frame buffer A disposed in the external memory 1010 as a display frame buffer to display data. Since the LCD panel 1009 needs to display an image once in about 16 ms, the LCD display control device 1003 reads the data of the frame buffer A several times repeatedly and applies the same to the LCD panel 1009. In the meantime, with the frame buffer B disposed in another address space of the external memory 1010 as a drawing frame buffer, the processor core 1001 draws an image to be displayed there next. After a lapse of 67 ms, the frame buffer B will serve as a display frame buffer and the frame buffer A will serve as a drawing frame buffer.

In recent years, an increase in a screen size and in the number of display colors is followed by an increase in the number of accesses to a frame buffer, so that these accesses make bus congestion conspicuous.

While the on-chip memory 1004 allows high-speed access, its capacity is limited due to constraints on chip area. Allocation of a plurality of frame buffers to the on-chip memory 1004 is accordingly difficult.

In practice, the on-chip memory 1004 is used as an instruction memory or a temporary work region for working when a high-load application requiring processing of a large amount of data is executed. Then, when necessary, data is transmitted and received between the on-chip memory 1004 and the external memory 1010. By arranging data whose access frequency is high in the on-chip memory 1004 to reduce the number of accesses to the external memory 1010 whose access speed is low, processing speed can be increased as a whole.

Methods of exchanging data between the external memory 1010 and the on-chip memory 1004 include a method conducted implicitly by hardware for software as by a cache memory which will be described later and activating a DMA controller by software.

Cache memory technique, which uses locality of an address as an access destination in a program code, is to realize speed up as a whole by copying a part of the contents of a large amount of memory into a high-speed memory of a small amount by hardware. The cache memory technique is widely used in a microprocessor and the like.

In the cache memory technique, data referred to by a program and data in its proximity are copied in the lump into a high-speed memory, and an address of the copied data is held. Then, in a subsequent access, an address of an access destination and the held address are compared to supply data of the high-speed memory in place of the data of the large amount of memory when they coincide with each other.

A display control system which efficiently handles frame data by a cache memory has been conventionally well known (e.g. see Japanese Patent Laying-Open (Kokai) No. Heisei 9-190169).

FIG. 12 is a block diagram showing one example of a structure of a conventional display control system.

With reference to FIG. 12, the conventional display control system has a display controller 1207 and a CPU 1201 connected to a cache memory 1204 through a cache controller 1202. When data displayed on a CRP 1208 exists in the cache memory 1204, data of the cache memory 1204 is read in place of data of a frame buffer 1206b allocated to a part of a region of a memory 1206a.

In this conventional example, further provided are two tags 1203a and 1203b of this cache memory. By selectively using the two tags 1203a and 1203b for an access from the CPU 1201 and for an access from the display controller 1207, simultaneous access from the CPU 1201 and the display controller 1207 is enabled. This realizes speed-up of access.

Thus, an advantage in using a cache memory is to benefit from a high-speed memory without specially rewriting software. Furthermore, by making data access adapted to a structure of the cache and optimizing data arrangement, a high-speed cache memory can be used to the best.

In a case where a cache memory is provided, an access address and an address of cached data need to be compared at every access. Therefore, hardware cost is increased and power consumption is increased as well.

In addition, depending on constraints on a capacity of a cache memory and the number of associations of a cache memory, when accessing data of the latter half of a frame buffer, data in the former half might be pushed out from the cache memory in some cases. In such a case, efficient use of a cache memory is impossible.

Use of an on-chip memory as a cache memory under hardware management makes it difficult to use the on-chip memory as a work memory when executing such high-load application as described above.

On the other hand, when executing an application requiring a small amount of memory, using the on-chip memory as a frame buffer memory enables the number of accesses to an external memory to be reduced, thereby reducing power consumption.

There are cases, however, where it is difficult to secure two frame buffer regions on an on-chip memory in terms of costs due to an increase in a screen size or the number of colorings. For developing 260,000 colors in the QVGA (320×240 dot) size, a frame buffer of about 170 Kbyte is required. For securing two frame buffers on an on-chip memory, memory whose capacity is as large as 340 Kbyte is required. Integrating the memory together with a work region of an application allocated to the on-chip memory into one chip will increase the chip area to invite an increase in costs.

On the other hand, with the method in which only a frame buffer for use in displaying is placed on an on-chip memory, processing of transferring drawn frame data from an external memory to an on-chip memory should be realized by means of software, resulting in increasing processing loads.

SUMMARY OF THE INVENTION

An object of the present invention is to provide an information processing device which enables efficient use of an on-chip memory accessible at a high speed with a simple hardware structure and without requiring special software processing.

According to the first aspect of the invention, an information processing device operable by using an external storage device connected through an external interface, comprising an internal storage unit accessible without using the external interface, at least one data processing unit which uses, for predetermined information processing, data read by uniformly accessing a predetermined address range of the external storage device through the external interface, and a determination unit which determines whether to write the data read from the external storage device by the data processing unit to the internal storage unit or not and writes the data determined to be written with the address translated according to predetermined rules at the translated address in the internal storage unit.

In the preferred construction, the data processing unit accesses the external storage device to read the data without address translation first time after receiving an updating notification of data within the address range of the external storage device from other data processing unit, and the determination unit writes the data read from the address range of the external storage device by the data processing unit without address translation to the internal storage unit.

In another preferred construction, when again reading the data within the address range of the external storage device, the data processing unit reads the data from the internal storage unit with the address translated according to the predetermined rules.

In another preferred construction, the data processing unit reads data while switching a plurality of address ranges of the external storage device, reads the data from the external storage device without address translation first time after switching the address range, and at the second and following times of repeatedly reading the data of the same the address range, reads the data from the internal storage unit with the address translated, and the determination unit overwrites the data read from the external storage device by the data processing unit without address translation to the internal storage unit.

In another preferred construction, a partial address range is predetermined for each of the address ranges, and the data processing unit, when data of no other part than the partial address range is updated, first time after switching the address range, reads the data from the external storage device only within the partial address range without address translation and reads the data from the internal storage unit within other part than the partial address range of the address range with the address translated.

In another preferred construction, the information processing device, further comprising a buffer unit which once accumulates data to be written to the internal storage unit by the determination unit and then writes the data to the internal storage unit.

In another preferred construction, the information processing device, further comprising a buffer unit which once accumulates data to be written to the internal storage unit by the determination unit and then writes the data to the internal storage unit, wherein the buffer unit holds the data once accumulated while write to the internal storage unit is not allowed and writes the data to the internal storage unit after write is enabled.

In another preferred construction, a unique identification number is allocated to each the data processing unit, and the determination unit determines to write only data read by the data processing unit having a predetermined identification number to the internal storage unit.

In another preferred construction, the data processing unit has a function of reading data while thinning out addresses as thin-out processing when the data can not be read within a predetermined time period to secure real-time operation, and at the time of again reading the data within the same the address range of the external storage device, if there remains data yet to be updated by the thin-out processing within the address range, again reads, without address translation, the data from the external storage device with respect to the whole of the address range.

In another preferred construction, the data processing unit has a function of reading data while thinning out addresses as thin-out processing when the data can not be read within a predetermined time period to secure real-time operation, and at the time of again reading the data within the same the address range of the external storage device, if there remains data yet to be updated by the thin-out processing within the address range, again reads, without address translation, the data from the external storage device with respect only to a thinned out address.

According to another aspect of the invention, an information processing device operable by using an external storage device connected through an external interface, comprising an internal storage unit accessible without using the external interface, at least one data processing unit which uses, for predetermined information processing, a series of data read by uniformly accessing a predetermined address range of the external storage device through the external interface and upon receiving a notification that the data is to be written to the internal storage unit, writes the data, with the address translated according to predetermined rules, at the translated address in the internal storage unit, and a determination unit which determines whether to write the data read from the external storage device by the data processing unit to the internal storage unit or not and when determining that the data is to be written, notifies the data processing unit to that effect.

In the preferred construction, the data processing unit writes, to the internal storage unit, data obtained as a result of execution of operation for the predetermined information processing with respect to the data determined to be written to the internal storage unit by the determination unit.

In another preferred construction, when again reading the data within the address range of the external storage device, the data processing unit reads the data from the internal storage unit with the address translated according to the predetermined rules to use the data without the operation for the predetermined information processing.

In another preferred construction, a unique identification number is allocated to each the data processing unit, and the determination unit determines to write only data read by the data processing unit having a predetermined identification number to the internal storage unit.

In another preferred construction, the data processing unit has a function of reading data while thinning out addresses as thin-out processing when the data can not be read within a predetermined time period to secure real-time operation, and at the time of again reading the data within the same the address range of the external storage device, if there remains data yet to be updated by the thin-out processing within the address range, again reads, without address translation, the data from the external storage device with respect to the whole of the address range.

In another preferred construction, the data processing unit has a function of reading data while thinning out addresses as thin-out processing when the data can not be read within a predetermined time period to secure real-time operation, and at the time of again reading the data within the same the address range of the external storage device, if there remains data yet to be updated by the thin-out processing within the address range, again reads, without address translation, the data from the external storage device with respect only to a thinned out address.

Thus, according to the information processing device of the present invention, when a data processing unit reads data of a predetermined address range from an external storage device, a determination unit writes data which will be probably again used thereafter to an internal storage unit with the address translated.

Accordingly, at the time of a first series of accesses to the eternal storage device by the data processing unit after data is updated, the determination unit writes data to the internal storage device, so that in line with the first series of accesses after the data is updated, the data in the internal storage unit is updated.

As a result, in place of the data on the external storage device, the data processing unit is thereafter allowed to use the data of the internal storage unit updated in line with the first series of accesses after the data is updated.

Also when adopting the double-buffer structure, since data of the internal storage unit is updated by a first access after buffer switching, with a memory capacity equivalent to one address range, the internal storage unit can be efficiently used for repeatedly using the same data and the number of accesses to the external storage device through an external interface can be reduced.

Therefore, with a part frequently updated set to be a partial address range, when data of no other part is updated at the time of switching, with respect to the part in question, the data of the internal storage unit is used without modification to again read only the data of the partial address range from the external storage device.

As a result, when an access from an ordinary bus to the internal storage unit and an access from the determination unit to the internal storage unit occur simultaneously, a buffer unit is allowed to queue data.

The data processing unit is accordingly allowed to write data read from the external storage device to the internal storage unit by an ordinary access.

The data processing unit is accordingly allowed to write data being operated which can be used in predetermined information processing without modification to the internal storage unit.

The data processing unit is therefore also allowed to read data being operated which can be used in predetermined information processing without modification from the internal storage unit and use the same.

The determination unit is accordingly allowed to identify the data processing unit which repeats reading of a series of data within the same address range by an identification number and determine that the read data should be written to the internal storage unit.

When thin-out processing occurs, the data processing unit is accordingly allowed to again read data from the external storage device with respect to the entire address range to take thinned-out data into the internal storage unit.

When thin-out processing occurs, the data processing unit is accordingly allowed to again read data from the external storage device with respect only to a thinned out address to take thinned out data into the internal storage unit.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

One embodiment of the present invention will be described in detail with reference to the drawings.

Figure 1:
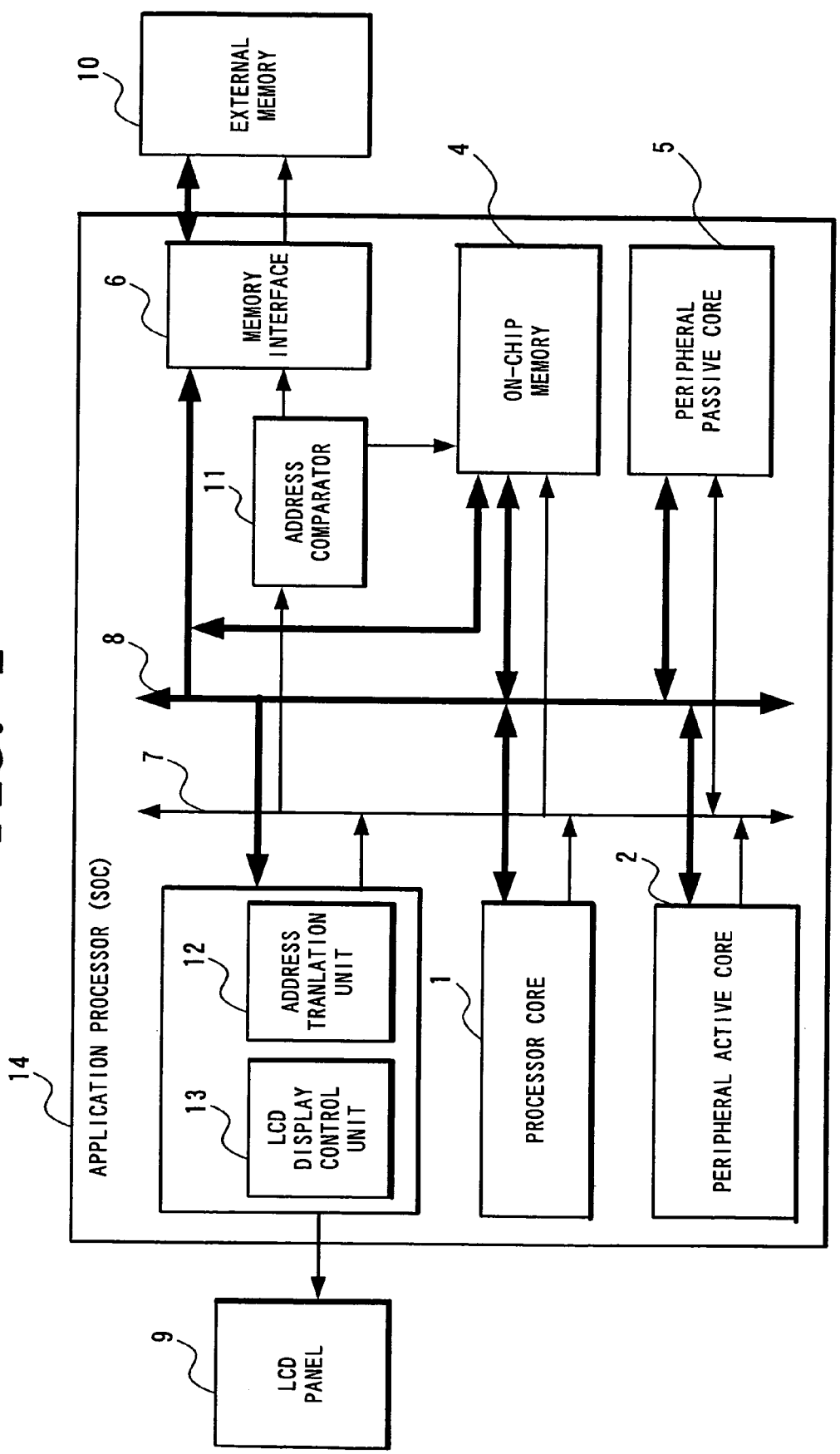
FIG. 1 is a block diagram showing a structure of an application processor chip according to one embodiment of the present invention.

FIG. 1 is a block diagram showing a structure of an application processor chip according to one embodiment of the present invention. With reference to FIG. 1, an application processor (SOC: System On Chip) 14 includes a processor core 1, a peripheral active core 2, an LCD display control device 3, an on-chip memory 4, a peripheral passive core 5 and a memory interface 6.

The LCD display control device 3 includes an LCD display control unit 13 and an address translation unit 12. The LCD display control unit 13 is connected to an on-chip address bus 7 and an on-chip data bus 8 through the address translation unit 12.

Other than the address translation unit 12, the processor core 1, the peripheral active core 2, the on-chip memory 4 and the peripheral passive core 5 are connected to the on-chip address bus 7 and the on-chip data bus 8. While the memory interface 6 is connected to the on-chip data bus 8, it is connected to the on-chip address bus 7 through an address comparator 11. The address comparator 11 is also connected to the on-chip memory 4.

To the on-chip memory 4, a data bus 15 for frame data write for writing data read from an external memory 10 is connected.

To the LCD display control device 3, an LCD panel 9 outside the chip is connected. To the memory interface 6, the external memory 10 outside the chip is connected.

The application processor 14 has two frame buffers having a double buffer structure placed in the external memory 10.

The processor core 1 controls each unit by executing a software program, thereby realizing operation of the application processor 14. The processor core 1 writes (draws) data of an image to a frame buffer on the external memory 10. When finishing drawing onto the frame buffer, the processor core 1 notifies the LCD display device 3 to that effect.

The LCD display control device 3 holds a start address of a frame buffer and data of a frame buffer size in a frame buffer address range designating register (not shown).

The LCD display control unit 13 reads data of the image drawn by the processor core 1 from a frame buffer at an address designated by the frame buffer address range designating register in line with a display speed of the LCD panel 9 and applies the data to the LCD panel 9.

The address translation unit 12 translates an address for an access from the LCD display control unit 13 to the frame buffer to select the external memory 10 or the on-chip memory 4 as an access destination. At this time, the address translation unit 12 selects the external memory 10 first time after receiving a notification from the processor core 1 that drawing is finished and selects the on-hip memory 4 at the second and following times.

The on-chip memory 4 is a high-speed accessible memory which is provided in the chip of the application processor 14.

The memory interface 6 is a circuit of the interface with the external memory 10.

The address comparator 11 has an address of the frame buffer on the external memory 10 stored in advance or externally applied. Then, the address comparator 11 compares an address of a read access from the LCD display control device 3 and an address stored in advance. When the address of the read access from the LCD display control device 3 coincides with the address stored in advance, that is, when the access is a read access to the frame buffer on the external memory 10, the comparator applies the data read from the external memory 10 to the LCD display control device 3, as well as outputting the address of the on-chip memory 4 so as to have the data written also to the on-chip memory 4. Thereafter, the LCD control device 3 makes a read access not to the external memory 10 but to the on-chip memory 4 by address translation by the address translation unit 12. As a result, the number of accesses to the external memory 10 is reduced.

The peripheral active core 2 is a peripheral circuit capable of conducting active operation (access). The peripheral passive core 5 is a passive peripheral circuit incapable of conducting active operation.

Figure 2:
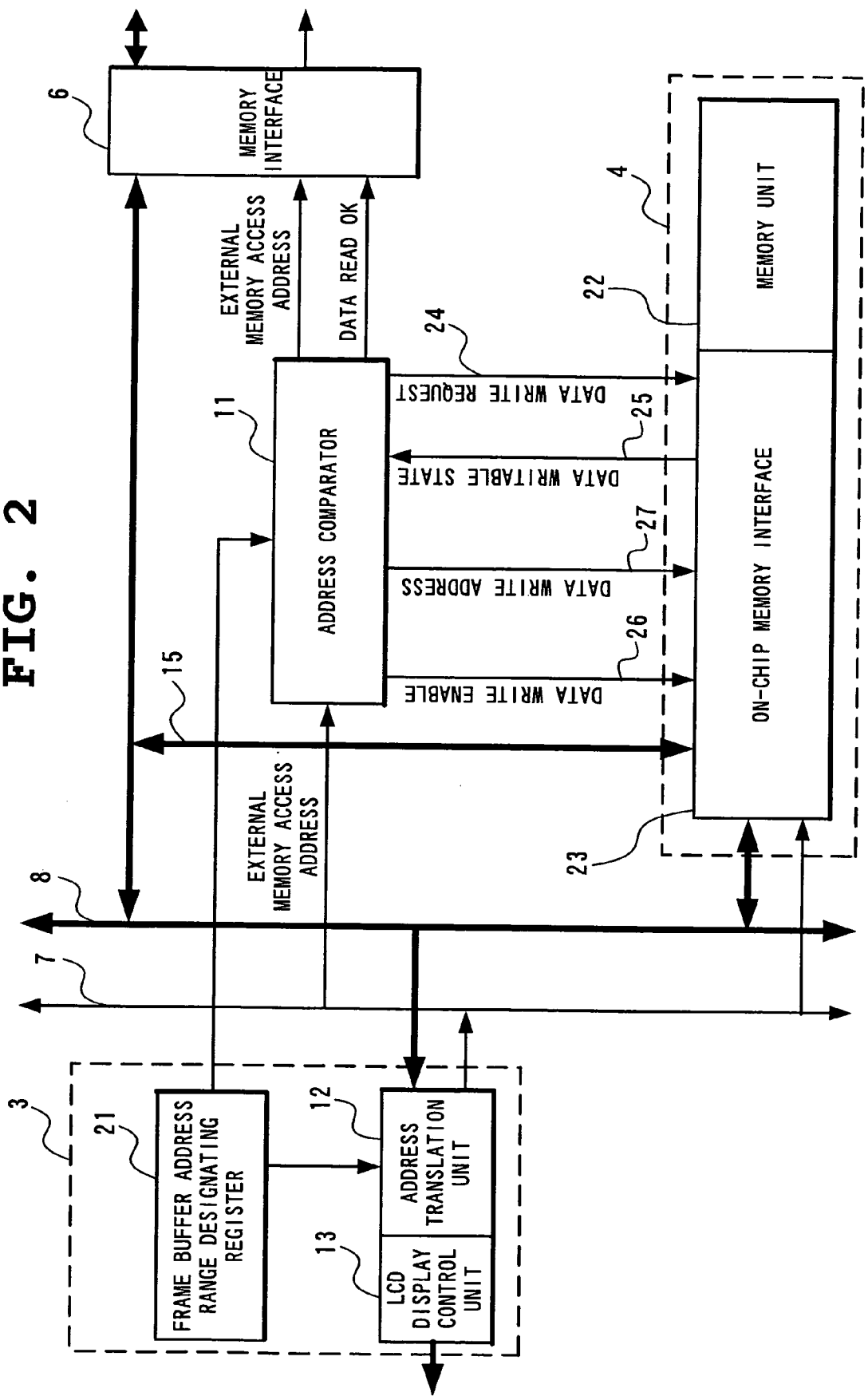
FIG. 2 is a diagram for use in explaining detailed structure and operation of the application processor according to the present embodiment.
Figure 3:
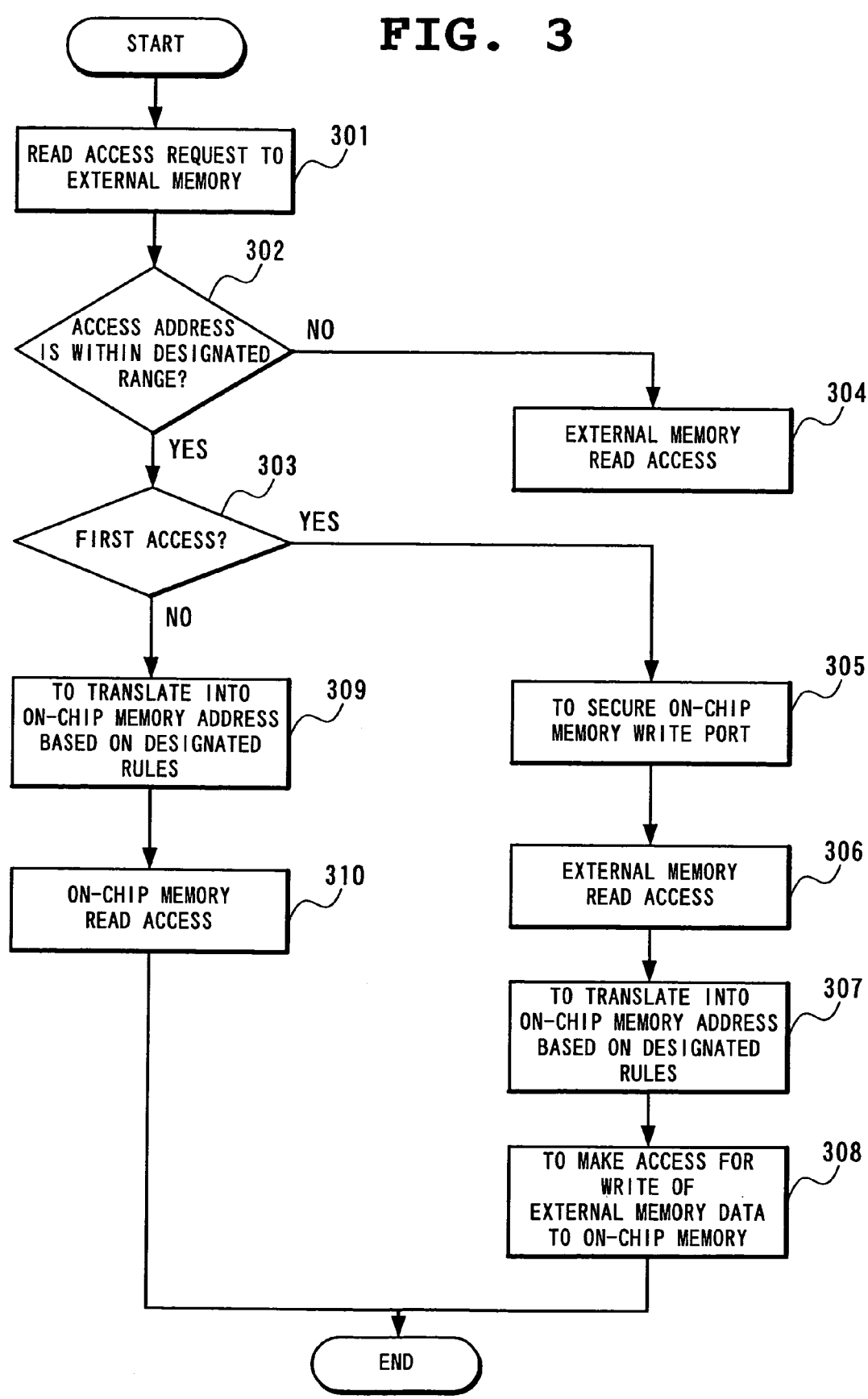
FIG. 3 is a flow chart showing operation of the application processor according to the present embodiment.

FIG. 2 is a diagram for use in explaining detailed structure and operation of the application processor according to the present embodiment. FIG. 3 is a flow chart showing operation of the application processor according to the present embodiment.

With reference to FIG. 2, illustrated is a frame buffer address range designating register 21 which is not shown in FIG. 1. The frame buffer address range designating register 21 applies an address range of a frame buffer to the address translation unit 12 and the address comparator 11. The address range is set by, for example, writing a value to the frame buffer address range designating register 21 by the processor core 1.

The on-chip memory 4 includes a memory unit 22 and an on-chip memory interface 23.

The memory unit 22 is a storage circuit for storing data. The on-chip memory interface 23 is a circuit of the interface with an on-chip bus.

Sent from the address comparator 11 to the on-chip interface 23 are a data write request signal 24, a data write enable signal 26 and a data write address 27. From the on-chip memory interface 23 to the address comparator 11, a data writable state signal 25 is sent.

The data write request signal 24 is a signal for requesting write of data read from the external memory 10 to the on-chip memory 4. The data writable state signal 25 is a signal for notifying that data write to the memory unit 22 by the address comparator 11 is possible.

With reference to FIG. 3, first, the LCD display control device 3 makes a read access request to the frame buffer of the external memory 10 (Step 301). The address comparator 11 determines whether it is an access to an address range designated in advance by the frame buffer address range designating register 21 (Step 302).

When the access from the LCD display control device 3 is an access to an address outside the address range designated in advance, it is executed as an ordinary access to the external memory 10, so that desired data is read by the LCD display control device 3 (Step 304).

When the access from the LCD display control device 3 is an access to an address within the address range designated in advance, the address comparator 11 determines whether the read access is a first access (Step 303).

When the access is the first, the address comparator 11 sends the data write request signal 24 to the on-chip memory interface 23 to request the memory unit 22 to secure a write port. This is to ensure a state where the address comparator 11 is allowed to write data to the on-chip memory 4 because even if data is read from the external memory 10 when the processor core 1 or the peripheral active core 2 accesses the on-chip memory 4, the data can not be written to the on-chip memory 4.

When the address comparator 11 receives a notification from the on-chip memory interface 23 by the data writable state signal 25 that a write port is secured, the data writable state is attained (Step 305).

Next, when the LCD display control device 3 makes an access for read from the frame buffer of the external memory 10 (Step 306), the address translation unit 12 translates the address of the external memory 10 into the address of the on-chip memory 4 according to predetermined rules (Step 307), so that the data read from the external memory 10 is written to the on-chip memory 4 (Step 308). Address obtained at that time is applied from the address comparator 11 as the data write address 27 to the on-chip memory interface 23. In addition, the data write enable signal 26 notifies that the data write address 27 is enabled. The predetermined rules are set such that the address of the frame buffer of the external memory 10 is translated into the frame cache region of the on-chip memory 4.

When the determination is made at Step 303 that the access is not the first, the address translation unit 12 translates the address of the external memory 10 into an address of the on-chip memory 4 (Step 309), so that data is read from the frame buffer region of the on-chip memory 4 (Step 310) and applied from the LCD display control device 3 to the LCD panel 9 to display an image on the LCD panel 9.

At Step 303, the address translation unit 12 determines whether the access is the first or not by the initial reference flag. When the processor core 1 finishes generating a new image in the external memory 10, set the initial reference flag. When the LCD display control device 3 finishes taking a round of read accesses within the designated address range, clear the initial reference flag.

The address translation unit 12 refers to the initial reference flag only when starting displaying a new image. This prevents a data supply source from switching between the on-chip memory 4 and the external memory 10 in the course of displaying of one image.

As described in the foregoing, the application processor 14 according to the present embodiment reduces the number of accesses to the external memory 10 to result in reducing power consumption accordingly because when the processor core 1 writes a new image into a frame buffer of the external memory 10, data of the external memory 10 is written to the on-chip memory 4 at the first access from the LCD display control unit 13 and thereafter until the image is rewritten, the data of the on-chip memory 4 will be used in displaying on the LCD panel 9.

Although in the present embodiment, the address comparator 11 determines on data to be taken into the on-chip memory 4 only according to the address range, the present invention is not limited thereto.

It is possible, for example, to assign an identification number to each core to make comparison among addresses including the identification numbers in order to limit an access to that from such a specific core as the LCD display control device 3.

This prevents, for example, data read when the processor core 1 makes a read access to the frame buffer space of the external memory 10 from being copied on the on-chip memory 4.

In addition, the application processor 14 of the present embodiment may be structured to have an on-chip memory write buffer for temporarily accumulating data to be written to the on-chip memory 4.

Figure 4:
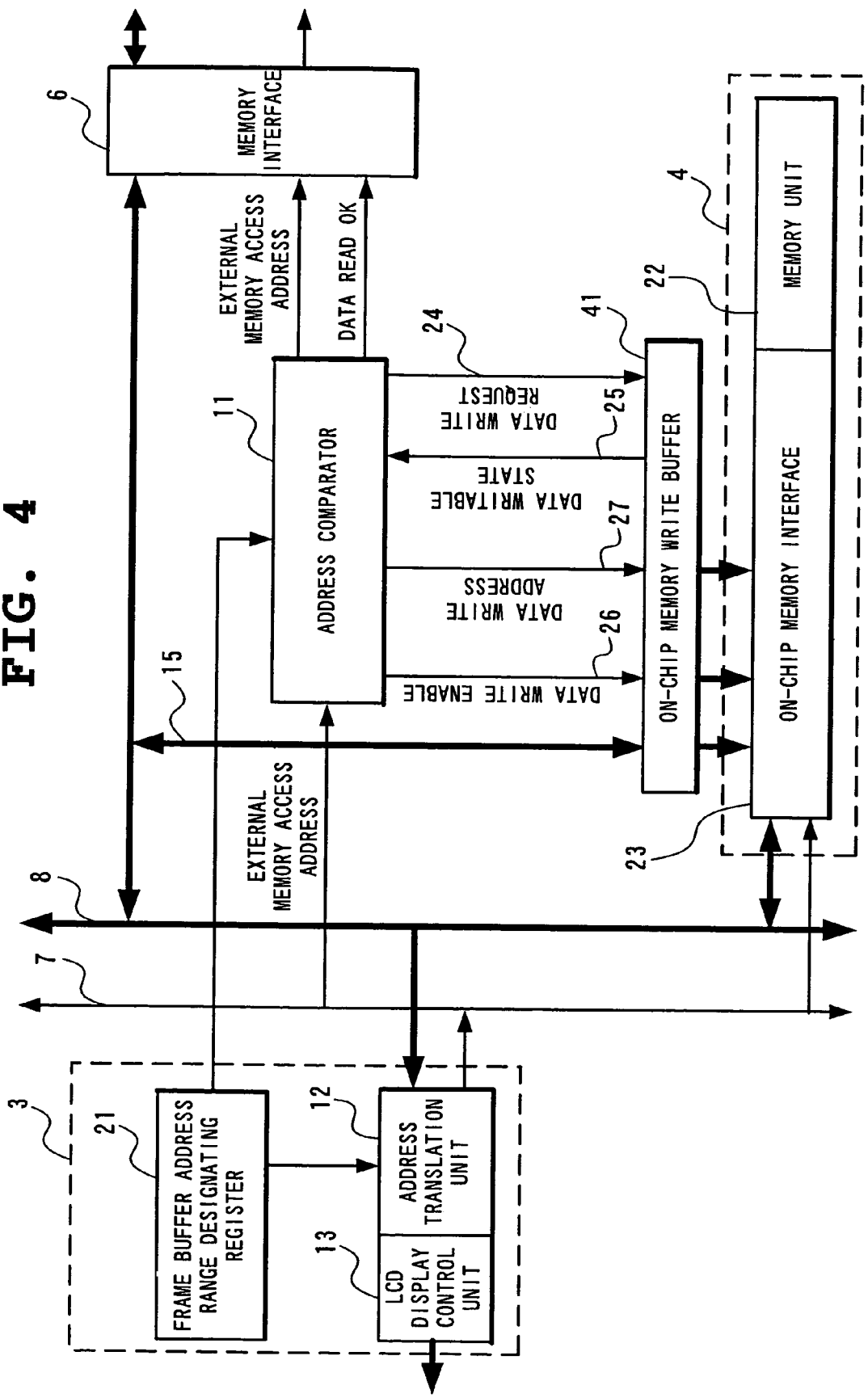
FIG. 4 is a flow chart showing operation of the application processor according to the present embodiment.

FIG. 4 is a diagram for use in explaining detailed structure and operation of an application processor having an on-chip memory write buffer. The application processor shown in FIG. 4 is different from that shown in FIG. 2 in that an on-chip memory write buffer 41 is provided between the address comparator 11 and the on-chip memory interface 23.

When the LCD display control device 3 makes a read access to the frame buffer on the external memory 10, the read data needs to be written to the on-chip memory 4 at the same time. Therefore, when the processor core 1 and each kind of peripheral active core 2 access the on-chip memory 4, if an event occurs that the LCD display control device 3 makes a read access to the frame buffer on the external memory 10, data-read from the external memory 10 should be kept waiting until the access to the on-chip memory 4 is completed in the structure shown in FIG. 2. In general, there is a case where severe time constraints are imposed on an access to a frame buffer by the LCD display control device 3, so that this wait time might invite a defect of an image.

With the structure shown in FIG. 4, while other core accesses the on-chip memory 4, the on-chip memory write buffer 41 temporarily stores data read from the external memory 10 and after the access is finished, writes the data to the on-chip memory 4.

This arrangement enables the LCD display control device 3 to read data instantaneously from the external memory 10 irrespective of existence/non-existence of an access to the on-chip memory 4 by other core.

As a matter of course, the capacity of the on-chip memory write buffer 41 is definite. Therefore, when the amount of data read from the external memory 10 exceeds the capacity, operation of queuing read from the external memory 10 should be conducted together. When setting the capacity of the on-chip memory write buffer 41 based on operation characteristics of each core, however, improvement in practical operation efficiency by the on-chip memory write buffer 41 having a fixed capacity can be expected.

Although the applicable embodiments have been illustrated so far regardless whether the double-buffer structure is adopted or not, other embodiment premised on that the double-buffer structure is adopted can be used.

In the double-buffer structure, a frame buffer (drawing frame buffer) for use in generating data of an image and a frame buffer (display frame buffer) for use in displaying an image are separately provided. The drawing frame buffer and the display frame buffer are alternately switched.

Figure 5:
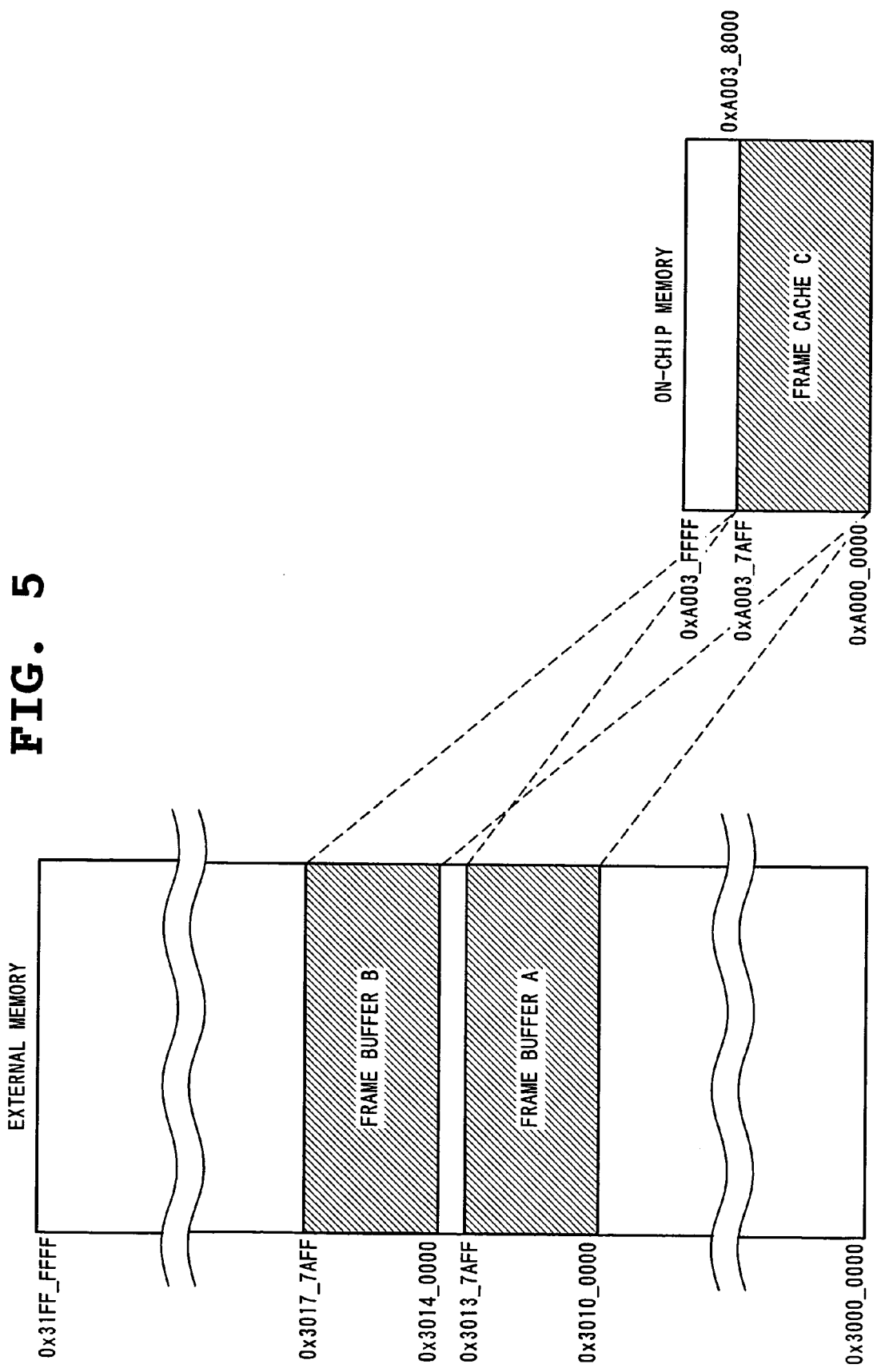
FIG. 5 is a diagram for use in explaining allocation of a frame buffer to each memory in the present embodiment adopting the double-buffer structure.

FIG. 5 is a diagram for use in explaining allocation of a frame buffer to each memory in the embodiment adopting the double-buffer structure. Structure of an application processor is the same as those shown in FIGS. 1 and 2.

With reference to FIG. 5, to the space of the external memory 10, two frame buffers, a frame buffer A and a frame buffer B, are allocated. On the other hand, in the space of the on-chip memory 4, a frame cache region for one is secured.

In the example shown in FIG. 5 to the addresses from 0x3010000 to 0x30137aff on the external memory 10 allocated to the addresses from 0x30000000 to 0x31ffffff, the frame buffer A is allocated and to the addresses from 0x30140000 to 0x30177aff, the frame buffer B is allocated. To the addresses from 0xa0000000 to 0xa0037aff on the on-chip memory 4 allocated to the addresses from 0xa0000000 to 0xa003ffff, a frame cache region C is allocated. Designation of these addresses is conducted by writing by, for example, the processor core 1 to the frame buffer address range designating register 21.

The LCD display control device 3 switches a frame to be displayed on the LCD between the frame buffer A and the frame buffer B at fixed intervals. It is a conventional practice that between switchings, data of the same frame buffer is used in displaying a plurality of times in succession.

In the present embodiment, out of the successive plurality of times, at the second and following times, data of the frame cache region C on the on-chip memory 4 is supplied.

Figure 6:
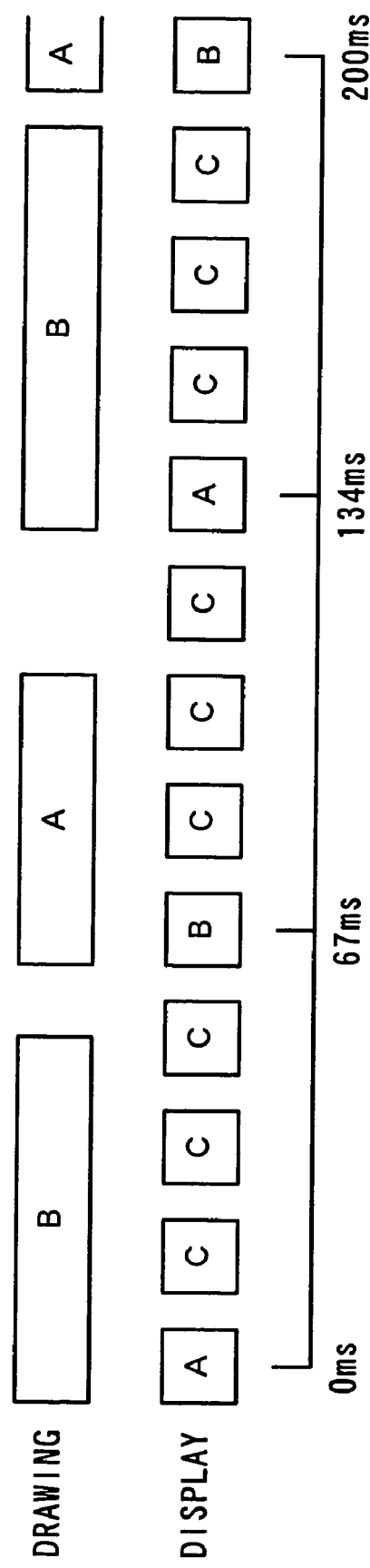
FIG. 6 is a diagram for use in explaining screen switching in another embodiment of the present invention.

FIG. 6 is a diagram for use in explaining screen switching in another embodiment of the present invention.

Switching of the frame buffers A and B is conducted by notifying the LCD display control device 3 of switching by the processor core 1 which generates an image or other peripheral active core 2. At this time, the initial reference flag is set.

In subsequent read from the LCD display control device 3, data of a new frame buffer on the external memory 10 is read. At this time, a frame cache region on the on-chip memory 4 is updated together.

For example, at the initial reference to the frame buffer B, the same contents as those of the frame buffer A are still held in the frame cache region C. When the data of the frame buffer B is once read and displayed on the LCD panel 9, however, the frame cache region C is updated to the contents of the frame buffer B to clear the initial reference flag.

Therefore, when displaying the data of the frame buffer B at the second and following times, the initial reference flag is cleared, so that data of the frame cache region C is supplied to the LCD display control unit 13 by the address translation by the address translation unit 12.

As compared with a case where the on-chip memory 4 is not used, software processing required in the present embodiment is only the processing of in advance designating, at the frame buffer address range designating register 21, address ranges of the frame buffers A and B and the frame cache C at the time of initialization. No other modification is required, e.g. modification of software for screen drawing processing.

Moreover, since it is unnecessary to store a large number of cached addresses by hardware and compare the address and an address to be accessed as is done by a conventional cache memory, cost of hardware can be drastically reduced.

In addition, when the frame cache function is unnecessary, the on-chip memory 4 can be used as a high-speed general-purpose memory to enhance the degree of freedom of software.

While the present embodiment has been described with respect to an example in which a screen is rewritten on a screen basis at the time of updating, other possible screen updating method is rewriting a part of the screen. In this case, the number of accesses to the external memory 10 can be further reduced.

Constant update regions A' and B' are respectively set to the frame buffers A and B allocated on the ordinary space of the external memory 10. The frame buffer address range designating register 41 needs to be expanded to enable address setting in the constant update regions. The constant update region is a region having a higher probability of being updated than other regions.

When only the constant update region is updated and other region is not, the contents of the frame buffer A and the frame buffer B will be the same in other region in question. When generating a new image, accordingly, if no other region than the constant update region is updated, other regions than the constant update region need not to have the contents of the frame cache C be rewritten when conducting switching between the frame buffer A and the frame buffer B.

Figure 7:
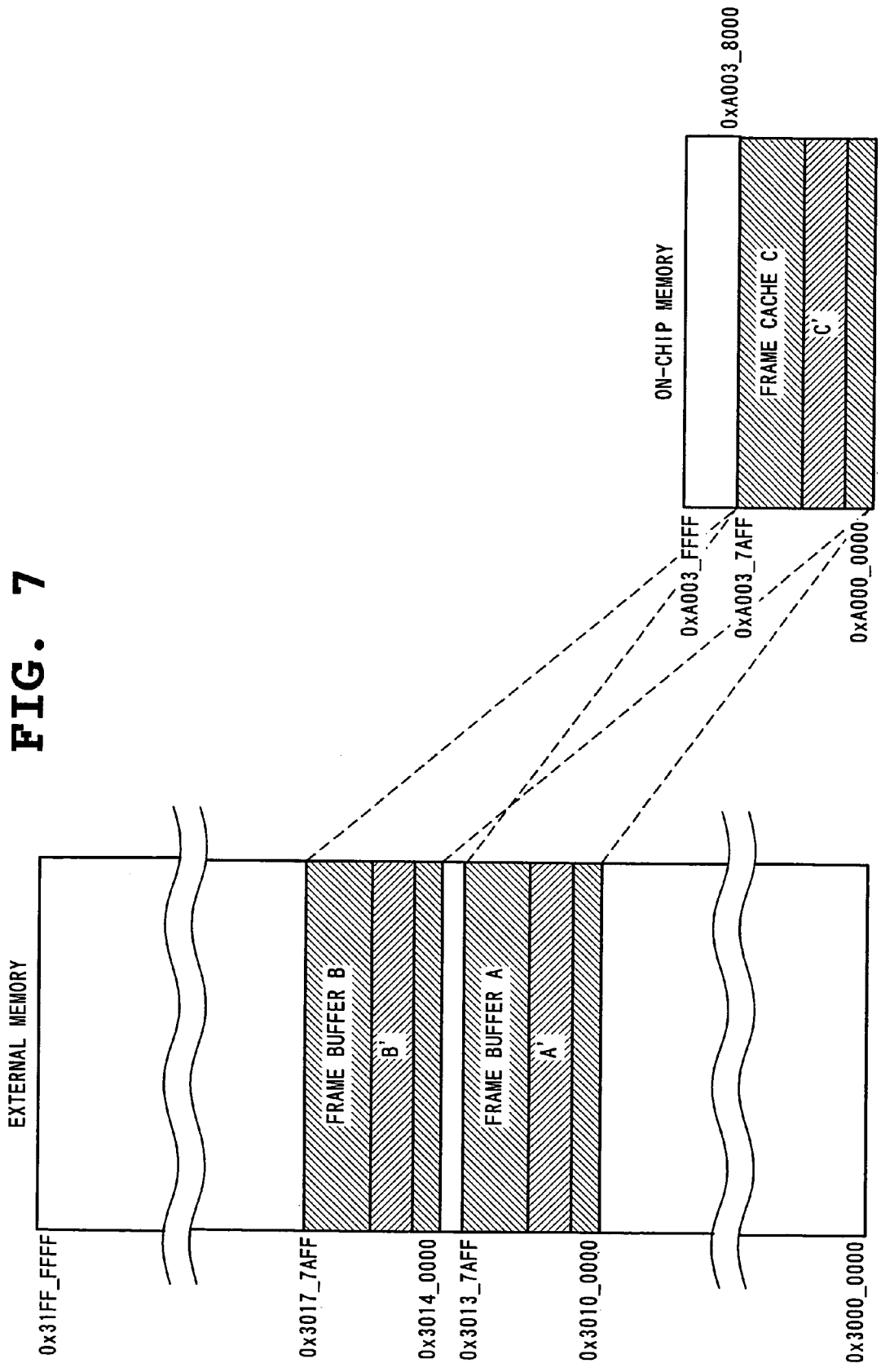
FIG. 7 is a diagram showing allocation of memory in a case where a constant update region is provided.

FIG. 7 is a diagram showing memory allocation in a case where a constant update region is provided.

When no other update is made than those of the constant update regions A' and B', the LCD display control device 3 only needs to read only an address range designated in the constant update regions A' and B' from the external memory 10 at initial reference. The data is taken into the on-chip memory 4. Even if the initial reference flag is set, with respect to other regions, the LCD display device 3 reads necessary data from the frame cache region C on the on-chip memory 4.

Thereafter, after the initial reference flag is cleared after one round of read accesses to the frame buffer, the LCD display control device 3 reads all the data on the screen from the frame cache region C on the on-chip memory 4.

When other region than the constant update region is rewritten, the LCD display control device 3 releases setting of the constant update regions A' and B'. When the initial reference flag is set as a result, the LCD display control device 3 reads all the data on the screen from the frame buffer A or the frame buffer B of the external memory 4.

When screen update is made such as rewrite of a part of the screen, if no other region than the constant update regions A' and B' is updated, this arrangement enables further reduction in the number of accesses to the external memory 10 by updating only the constant update region when conducting switching between the drawing frame buffer and the display frame buffer.

In the embodiments described in the foregoing, when the LCD display control device 3 reads data from the external memory 10 and writes the data to the on-chip memory 4 at the same time, it has no address of each data. This produces the effect of reducing hardware costs.

When smooth data supply is prevented due to bus or memory congestion, however, the LCD display control device 3 conducts thinning-out processing of giving up displaying some lines in an image to proceed with processing of displaying a subsequent line in some cases. This is the processing for maintaining real-time display of images.

When thin-out processing is conducted, simply writing data read from the external memory 10 to the on-chip memory 4 by the LCD display control device 3 results in that data of the preceding screen remains because with respect to a thinned out line, data of the frame buffer of the external memory 10 will not be properly reflected on the on-chip memory 4.

As a method of coping with the problem in the thin-out processing, when the thin-out processing is conducted at the time of updating a frame cache on the on-chip memory 4, data of next display should be read as well from the frame buffer of the external memory 10 without clearing the initial reference flag.

In this case, since an initial reference flag 82 is set, if once the thin-out processing occurs while one screen of image is read from the external memory 10, the LCD display control device 3 refrains from clearing the initial reference flag even when transfer of all the data of the screen is completed.

As a result, in the subsequent display, no address translation is conducted by the address translation device 12 and data is read not from the on-chip memory 4 but from the external memory 10. Then, when the LCD display control device 3 conducts operation of reading data to be displayed, data is again taken from the external memory 10 into the on-chip memory 4.

If no thin-out processing occurs at this time, the initial reference flag is cleared and when displaying the same frame next time, the LCD display control device 3 will take out data from the on-chip memory 4. Thus, when the thin-out processing occurs, data of the external memory 10 is repeatedly read and when no thin-out processing occurs, the number of accesses to the external memory 10 can be reduced by using data of the on-chip memory 4.

Another method of coping with the thin-out processing is storing an address of a line thinned out and next time reading only the data of the address from the external memory 10 to further improve efficiency.

Figure 8:
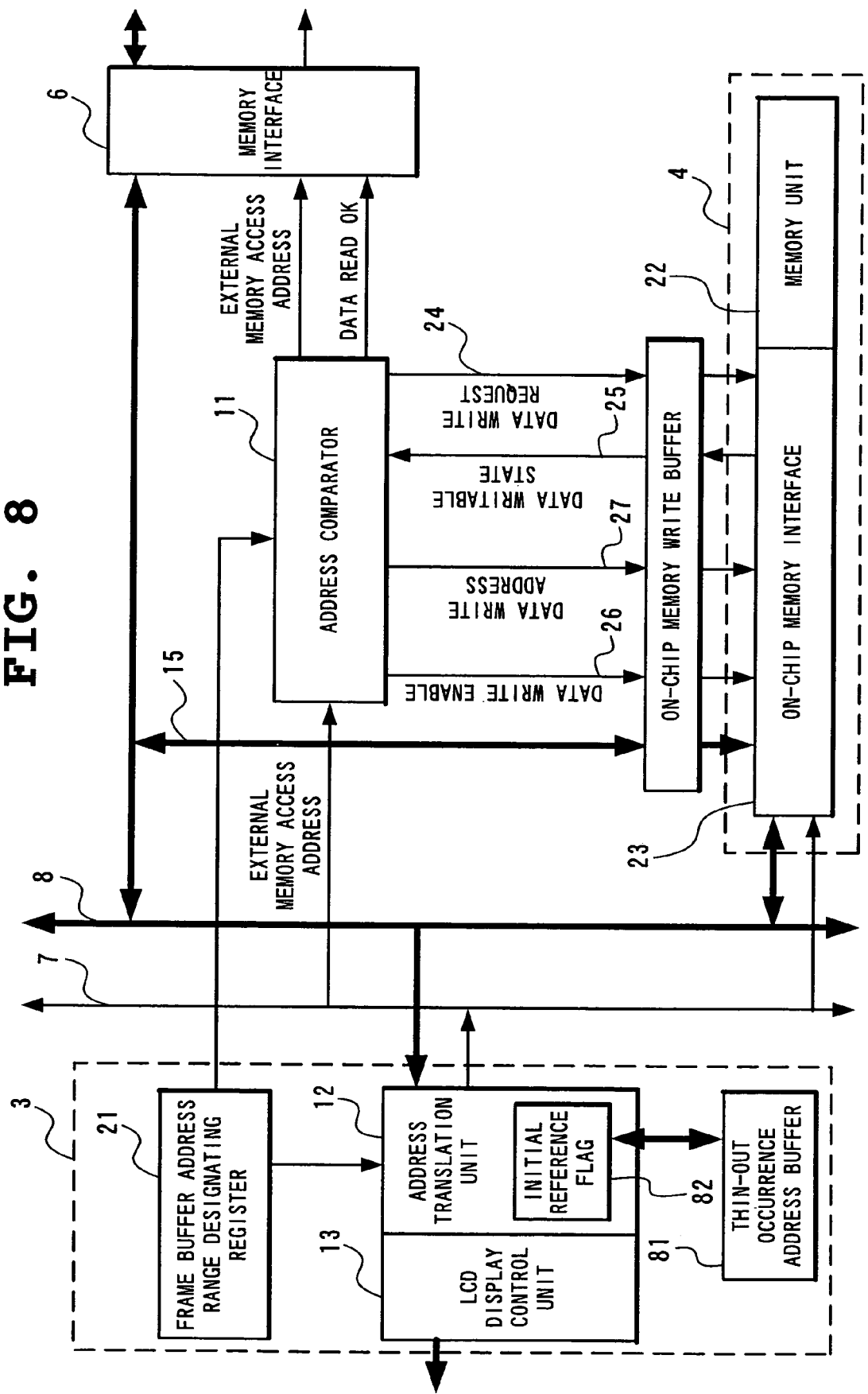
FIG. 8 is a diagram for use in explaining detailed structure and operation of an application processor designed to read only an address subjected to thinning-out processing again from an external memory.

FIG. 8 is a diagram for use in explaining detailed structure and operation of an application processor designed to again read only an address subjected to thin-out processing from the external memory.

The application processor illustrated in FIG. 8 differs from that shown in FIG. 4 in having a thin-out occurrence address buffer 81. Also illustrated in FIG. 8 is a initial reference flag 82.

The LCD display control device 3 records, in the thin-out occurrence address buffer 81, an address at which thin-out processing occurs in a read access. Then, when displaying the same frame next time, the LCD display control device 3 searches the thin-out address buffer 81 and again reads, from the external memory 10, only an address at which thin-out processing occurs to prevent data of the external memory 10 from being reflected on the on-chip memory 4.

Data of an address at which no thin-out processing occurs is supplied to the LCD display control device 3 from a frame cache region on the on-chip memory 4 the next and following times.

Then, when the data of the address at which the thin-out processing occurs is normally read from the external memory 10, the data is taken into the on-chip memory 4, so that the LCD display control device 3 deletes the address from the thin-out occurrence address buffer 81.

Even under a condition where access to the external memory 10 congests to have thin-out processing frequently occur, this arrangement enables data of the frame buffer of the external memory 10 to be gradually taken into the on-chip memory 4, thereby reducing the number of accesses to the external memory 10.

As a matter of course, the number of addresses (the number of entries) which can be registered in the thin-out occurrence address buffer 81 is definite. Selecting the number of entries allowed by the thin-out occurrence address buffer 81 based on operation characteristics of each core obtains the above-described effects within a practical range.

Nonetheless, there might temporarily occur thin-out processing at addresses exceeding the number of entries allowed by the thin-out occurrence address buffer 81. In this case, without clearing the initial reference flag, when displaying an image of the same frame next time, all the data of the screen should be supplied from the frame buffer on the external memory 10 to the LCD display control device 3.

The application processor shown in FIG. 1 is equipped with the data bus 15 dedicated to frame data write for writing data to the on-chip memory 4 when the LCD display control device 3 reads data from the frame buffer on the external memory 10. It is also possible to write frame data to the on-chip memory 4 by the LCD display control device 3.

Figure 9:
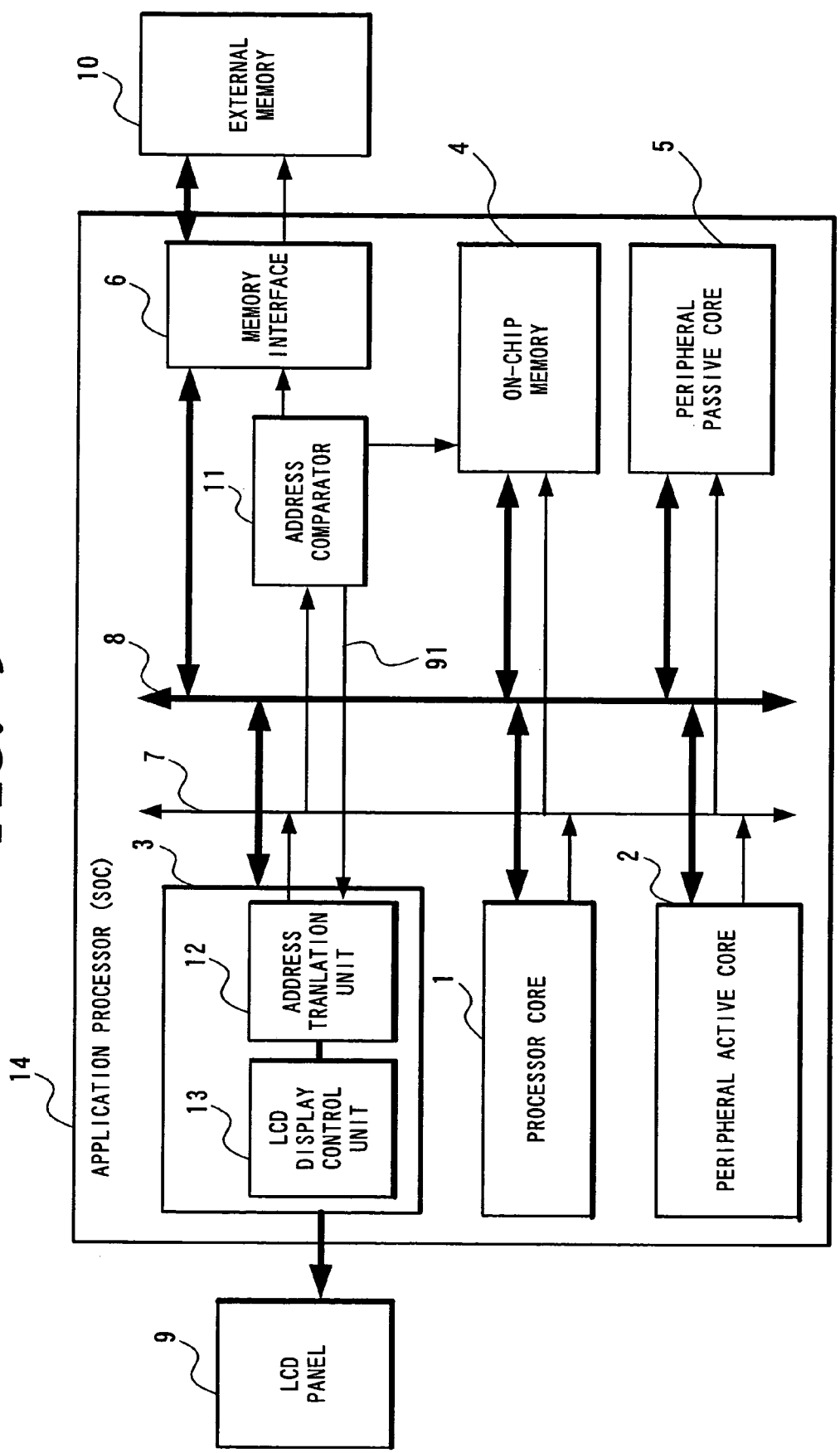
FIG. 9 is a block diagram showing a structure of an application processor in which an LCD display control device writes image data to an on-chip memory.
Figure 10:
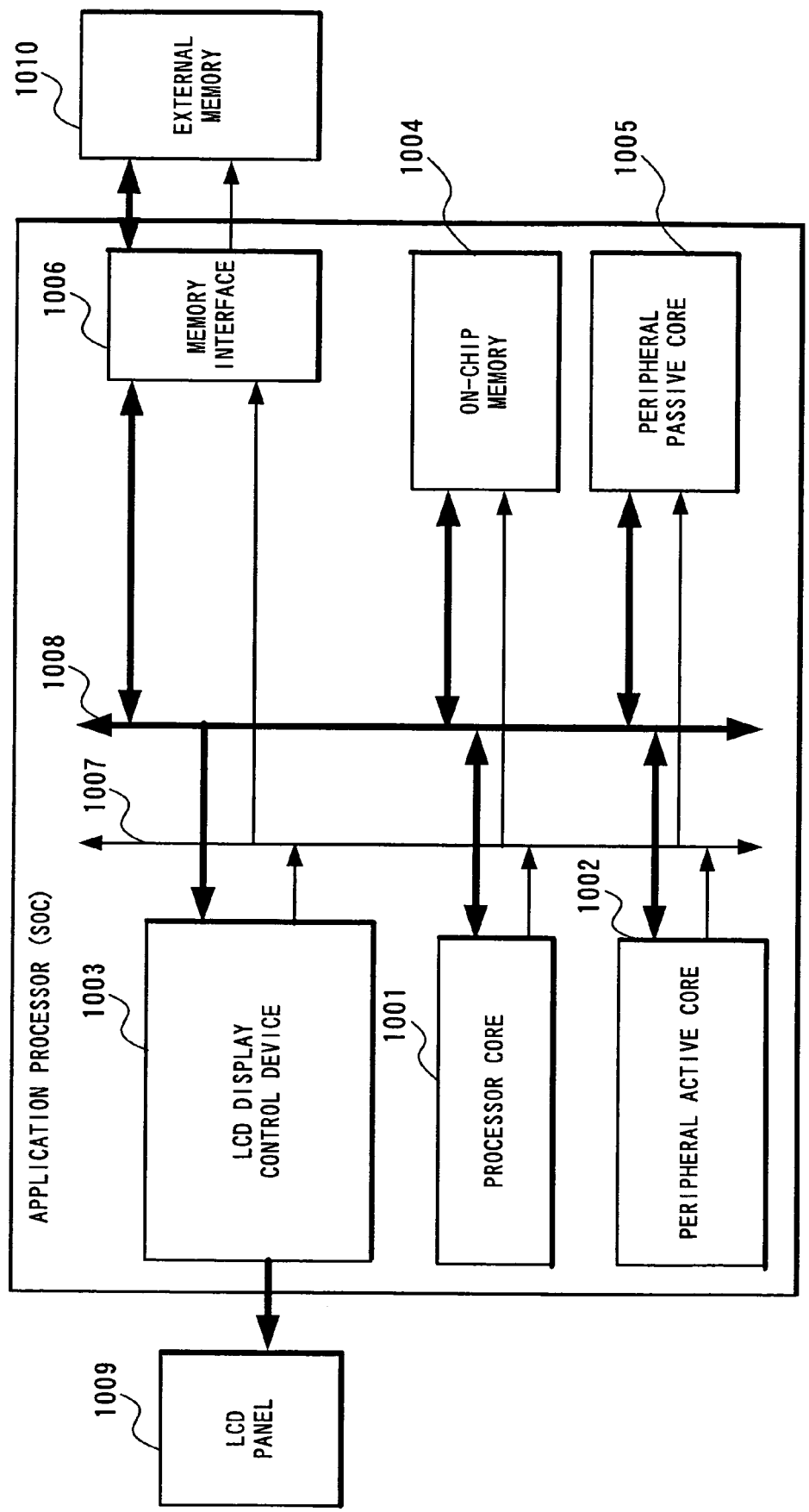
FIG. 10 is a block diagram showing a structure of a conventional and typical application processor.
Figure 11:
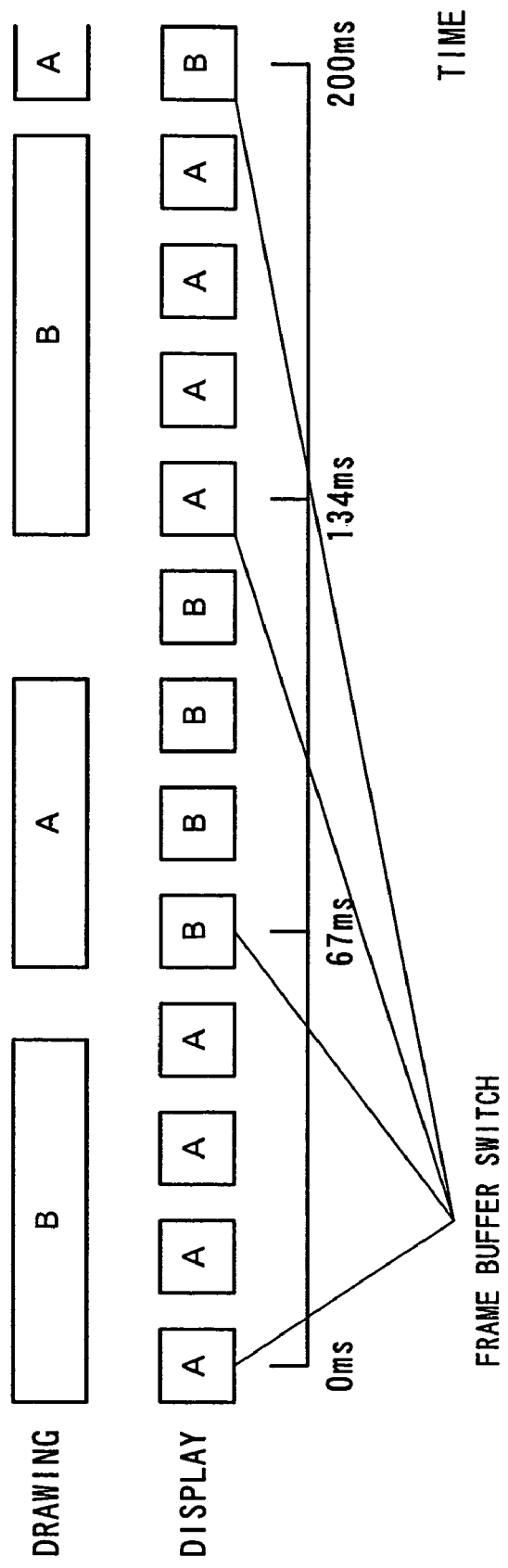
FIG. 11 is a diagram for use in explaining conventional screen switching.
Figure 12:
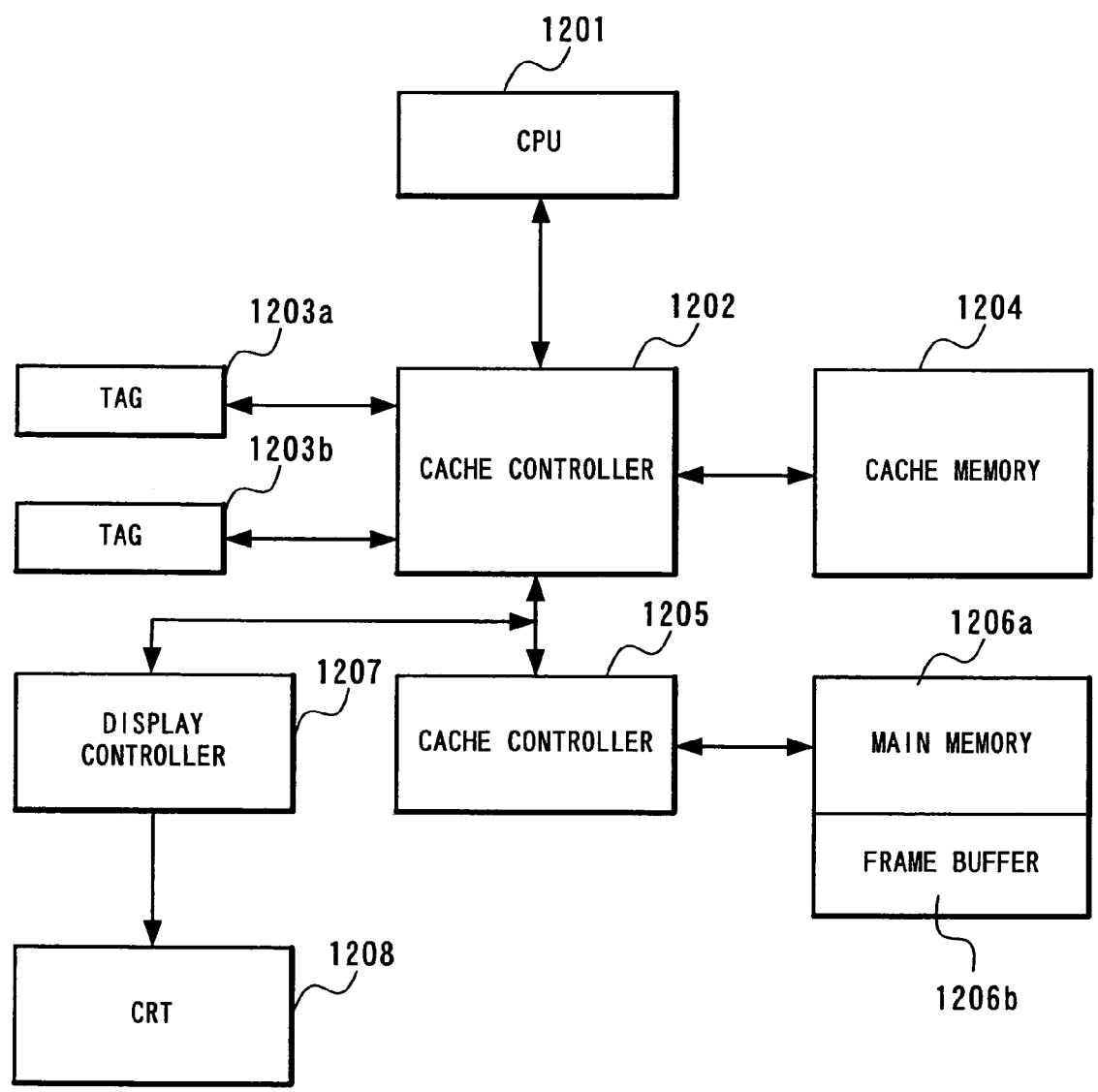
FIG. 12 is a block diagram showing one example of a structure of a conventional display control system.

FIG. 9 is a block diagram showing a structure of an application processor designed to have an LCD display control device write image data to an on-chip memory. The application processor shown in FIG. 9 differs from that shown in FIG. 1 in that no data bus for writing frame data to the on-chip memory 4 is provided and in place, a write request signal 91 is sent from the address comparator 11 to the LCD display control device 3.

When the LCD display control device 3 reads data of a frame buffer from the external memory 10 to conduct necessary processing, the address comparator 11 sends the write request signal 91 to the LCD display control device 3.

Upon receiving the write request signal 91, the LCD display control device 3 writes data into a predetermined region of the on-chip memory 4 through the address translation unit 12 according to an ordinary data write bus protocol. Then, upon writing all the frame data of the screen to the on-chip memory 4, the LCD display control device 3 clears the initial reference flag.

Then, when again displaying a screen of the same frame buffer region thereafter, the LCD display control device 3 translates an access to the frame buffer on the external memory 10 into an address of the frame cache region of the internal memory 4 to read data from the frame cache region.

As ordinary processing conducted by the LCD display control device 3, data of an image read from the external memory 10 is subjected to such processing as format change and then displayed on the LCD panel 9 in some cases. In this case, when repeatedly displaying the same frame buffer, the LCD display control device 3 might repeat the same format change processing every time. On the other hand, with the application processor shown in FIG. 9, making data to be written to the on-chip memory 4 be data whose format has been changed enables the number of accesses to the external memory 10 to be reduced, as well as enabling processing of format change to be mitigated.

According to the information processing device of the present invention, since when the data processing unit reads data of a predetermined address range from the external storage device, the determination unit writes data which will be probably again used thereafter to the internal storage unit with the address translated, the data processing unit is thereafter allowed to use the data of the high-speed accessible internal storage unit with respect to the data within a predetermined address range with a simple hardware structure and without requiring special software processing, thereby reducing the number of accesses to the external storage device through the external interface and reducing power consumption as well.

In addition, since at the time of a first series of accesses to the eternal storage device by the data processing unit after data is updated, the determination unit writes data to the internal storage device, the data in the internal storage unit is updated in line with the first access, so that the data in the internal storage unit will be thereafter usable to reduce the number of accesses to the external storage device through the external interface.

Also in a case where the double-buffer structure is adopted, since data of the internal storage unit is updated by a first access after buffer switching, with a memory capacity equivalent to one address range, the internal storage unit can be efficiently used for repetitions of use of the same data and the number of accesses to the external storage device through the external interface can be reduced.

In addition, since with a frequently updated part set to be a partial address range, when data of no other part is updated at the time of switching, with respect to the part in question, the data of the internal storage unit is used without modification to again read only the data of the partial address range from the external storage device, the number of accesses to the external storage device through the external interface can be further reduced.

Moreover, since when an access from an ordinary bus to the internal storage unit and an access from the determination unit to the internal storage unit occur simultaneously, the buffer unit queues data, accesses occurring simultaneously can be normally ended without contradiction.

Furthermore, since the data processing unit is capable of writing data read from the external storage device to the internal storage unit by an ordinary access, no dedicated signal line is required to scale down hardware.

Moreover, since the data processing unit writes data being operated which can be used in predetermined information processing without modification to the internal storage unit, the same operation needs not be repeated thereafter.

Since the data processing unit reads data being operated which can be used in predetermined information processing without modification from the internal storage unit and use the same, processing load of the data processing unit can be mitigated.

Since the determination unit identifies the data processing unit which repeats reading of a series of data within the same address range by an identification number and determines that the read data should be written to the internal storage unit, determination can be made with ease on data of the internal storage unit whose use is effective.

Since when thin-out processing occurs, the data processing unit again reads data from the external storage device with respect to the entire address range, even when thin-out processing occurs, it is possible to prevent old data in the internal storage unit from being used by the data processing unit.

Alternatively, since when thin-out processing occurs, the data processing unit again reads only data of a thinned out address from the external storage device, even when thin-out processing occurs, old data in the internal storage unit will not be used by the data processing unit and the number of accesses to the external storage device can be reduced as much as possible.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An information processing device operable by using an external storage device connected through an external interface, comprising:
   an external storage unit accessible without using said external interface;
   at least one data processing unit which uses, for predetermined information processing, data read by uniformly accessing a predetermined address range of said external storage device through said external interface; and
   a determination unit which determines whether to write said data read from said external storage device by said data processing unit to an internal storage unit, translates an address corresponding to a memory address space of said information processing device and enables reading and writing in accordance with the address and predetermined rules, and writes the data determined to be written with the address translated according to said predetermined rules at the translated address in said internal storage unit.

2. The information processing device as set forth in claim 1, wherein
   said data processing unit accesses said external storage device to read said data without address translation a first time after receiving an updating notification of data within said address range of said external storage device from another data processing unit, and said determination unit writes said data read from said address range of said external storage device by said data processing unit without address translation to said internal storage unit.

3. The information processing device as set forth in claim 2, wherein
   when again reading said data within said address range of said external storage device, said data processing unit reads said data from said internal storage unit with the address translated according to said predetermined rules.

4. The information processing device as set forth in claim 1, wherein
   said data processing unit reads data while switching a plurality of address ranges of said external storage device, reads said data from said external storage device without address translation a first time after switching said address range, and at the second and following times of repeatedly reading the data of the same said address range, reads said data from said internal storage unit with the address translated, and said determination unit overwrites said data read from said external storage device by said data processing unit without address translation to said internal storage unit.

5. The information processing device as set forth in claim 4, wherein
a partial address range is predetermined for each of said address ranges, and
said data processing unit, when data of no other part than said partial address range is updated, a first time after switching said address range, reads said data from said external storage device only within the partial address range without address translation and reads said data from said internal storage unit within a part other than said partial address range of said address range with the address translated.

6. The information processing device as set forth in claim 1, further comprising
a buffer unit which once accumulates data to be written to said internal storage unit by said determination unit and then writes the data to the internal storage unit.

7. The information processing device as set forth in claim 6, further comprising a buffer unit which accumulates data to be written to said internal storage unit by said determination unit and then writes the data to the internal storage unit, wherein
said buffer unit holds said accumulated data when writing to said internal storage unit is not allowed and writes said data to said internal storage unit after write is enabled.

8. The information processing device as set forth in claim 1, wherein
a unique identification number is allocated to each of said data processing units, and
said determination unit determines to write only data read by the data processing unit having a predetermined identification number to said internal storage unit.

9. The information processing device as set forth in claim 3, wherein
said data processing unit has a function of reading data while thinning out addresses as thin-out processing when the data can not be read within a predetermined time period to secure real-time operation, and at the time of again reading said data within the same said address range of said external storage device, if there remains data yet to be updated by said thin-out processing within said address range, again reads, without address translation, said data from said external storage device with respect to the whole of said address range.

10. The information processing device as set forth in claim 3, wherein
said data processing unit has a function of reading data while thinning out addresses as thin-out processing when the data can not be read within a predetermined time period to secure real-time operation, and at the time of again reading said data within the same said address range of said external storage device, if there remains data yet to be updated by said thin-out processing within said address range, again reads, without address translation, said data from said external storage device with respect only to a thinned out address.

11. An information processing device operable by using an external storage device connected through an external interface, comprising:
an internal storage unit accessible without using said external interface;
at least one data processing unit which uses, for predetermined information processing, a series of data read by uniformly accessing a predetermined address range of said external storage device through said external interface and upon receiving a notification that the data is to be written to said internal storage unit, writes said data, with the address translated according to predetermined rules, at the translated address in said internal storage unity; translates an address corresponding to a memory address space of said information processing device and enables reading and writing in accordance with the address and predetermined rules, and writes said data at the translated address in said internal storage unit; and
a determination unit which determines whether to write said data read from said external storage device by said data processing unit to said internal storage unit or not and when determining that the data is to be written, notifies said data processing unit to that effect.

12. The information processing device as set forth in claim 11, wherein
said data processing unit writes, to said internal storage unit, data obtained as a result of execution of operation for said predetermined information processing with respect to said data determined to be written to said internal storage unit by said determination unit.

13. The information processing device as set forth in claim 12, wherein
when again reading said data within said address range of said external storage device, said data processing unit reads said data from said internal storage unit with the address translated according to said predetermined rules to use the data without said operation for said predetermined information processing.

14. The information processing device as set forth in claim 11, wherein a unique identification number is allocated to each of said data processing units, and
said determination unit determines to write only data read by the data processing unit having a predetermined identification number to said internal storage unit.

15. The information processing device as set forth in claim 13, wherein
said data processing unit has a function of reading data while thinning out addresses as thin-out processing when the data can not be read within a predetermined time period to secure real-time operation, and at the time of again reading said data within the same said address range of said external storage device, if there remains data yet to be updated by said thin-out processing within said address range, again reads, without address translation, said data from said external storage device with respect to the whole of said address range.

16. The information processing device as set forth in claim 13, wherein
said data processing unit has a function of reading data while thinning out addresses as thin-out processing when the data cannot be read within a predetermined time period to secure real-time operation, and at the time of again reading said data within the same said address range of said external storage device, if there remains data yet to be updated by said thin-out processing within said address range, again reads, without address translation, said data from said external storage device with respect only to a thinned out address.

* * * * *